(12) United States Patent
Dai et al.

(10) Patent No.: US 12,463,693 B2
(45) Date of Patent: Nov. 4, 2025

(54) RIS-ASSISTED WIRELESS COMMUNICATIONS

(71) Applicant: BRITISH TELECOMMUNICATIONS PUBLIC LIMITED COMPANY, London (GB)

(72) Inventors: Linglong Dai, Beijing (CN); Ruochen Su, Huaibei (CN); Jingbo Tan, Beijing (CN); Mo Hao, Beijing (CN); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 458 days.

(21) Appl. No.: 18/000,164

(22) PCT Filed: Apr. 12, 2021

(86) PCT No.: PCT/EP2021/059385
§ 371 (c)(1),
(2) Date: Nov. 29, 2022

(87) PCT Pub. No.: WO2021/239311
PCT Pub. Date: Dec. 2, 2021

(65) Prior Publication Data
US 2023/0208486 A1    Jun. 29, 2023

(30) Foreign Application Priority Data
May 29, 2020    (WO) ................ PCT/CN2020/093299

(51) Int. Cl.
H04B 7/06      (2006.01)
H04B 7/0456    (2017.01)
H04B 7/145     (2006.01)

(52) U.S. Cl.
CPC ......... *H04B 7/0617* (2013.01); *H04B 7/0456* (2013.01); *H04B 7/0626* (2013.01); *H04B 7/145* (2013.01)

(58) Field of Classification Search
CPC .. H04B 7/0617; H04B 7/0456; H04B 7/0626; H04B 7/145; H04B 7/04013;
(Continued)

(56) References Cited

U.S. PATENT DOCUMENTS

| 7,962,755 B2 | 6/2011 | Pizano |
| 8,219,593 B2 | 7/2012 | Tunkelang et al. |

(Continued)

FOREIGN PATENT DOCUMENTS

| CN | 105812126 A | 7/2016 | |
| CN | 106911001 A * | 6/2017 | ........... H01Q 15/148 |

(Continued)

OTHER PUBLICATIONS

Basar E., et al., "Wireless Communications through Reconfigurable Intelligent Surfaces," IEEE Access, Aug. 13, 2019, vol. 7, pp. 116753-11673.

(Continued)

*Primary Examiner* — Lana N Le
(74) *Attorney, Agent, or Firm* — EIP US LLP

(57) ABSTRACT

A reflective surface for directing wireless communications signals that includes a plurality of independently reconfigurable elements disposed irregularly on the surface is disclosed. A method of controlling a communication channel of a wireless communication system that includes the reflective surface having an irregular element arrangement is also disclosed.

7 Claims, 3 Drawing Sheets

(58) Field of Classification Search
CPC .............. H04B 7/0857; H04B 7/15528; H04B 7/15507; H04B 7/086; H04B 1/1027; H04B 1/0475; H04B 5/73; H01Q 21/29; H01Q 3/46; H01Q 17/00; H01Q 15/14; H01Q 15/148

See application file for complete search history.

(56) References Cited

U.S. PATENT DOCUMENTS

| | | | |
|---|---|---|---|
| 8,879,813 | B1 | 11/2014 | Solanki et al. |
| 9,280,560 | B1 | 3/2016 | Dube et al. |
| 9,619,213 | B2 | 4/2017 | Gupta |
| 9,672,760 | B1 | 6/2017 | Breuer |
| 9,684,775 | B2 | 6/2017 | Gupta et al. |
| 10,270,770 | B1 | 4/2019 | Irwan et al. |
| 10,305,690 | B1 | 5/2019 | Gehrmann |
| 10,333,720 | B2 | 6/2019 | Kravitz et al. |
| 10,552,709 | B2 | 2/2020 | Fua et al. |
| 10,607,027 | B1 | 3/2020 | Ben Naim et al. |
| 10,649,970 | B1 | 5/2020 | Saxe et al. |
| 10,771,310 | B2* | 9/2020 | Palenius .............. H04B 7/0617 |
| 10,778,450 | B1 | 9/2020 | Griffin |
| 10,824,942 | B1 | 11/2020 | Bhotika et al. |
| 10,853,516 | B2 | 12/2020 | He |
| 11,514,448 | B1 | 11/2022 | Liberman |
| 2005/0086061 | A1 | 4/2005 | Holtmanns et al. |
| 2007/0050303 | A1 | 3/2007 | Schroeder |
| 2009/0125084 | A1 | 5/2009 | Juels |
| 2012/0079273 | A1 | 3/2012 | Bacchiaz |
| 2014/0164106 | A1 | 6/2014 | Naik et al. |
| 2014/0289833 | A1 | 9/2014 | Briceno et al. |
| 2014/0331277 | A1 | 11/2014 | Frascadore et al. |
| 2015/0016379 | A1* | 1/2015 | Nam .................... H04B 7/0617 |
| 2015/0304101 | A1 | 10/2015 | Gupta et al. |
| 2015/0332283 | A1 | 11/2015 | Witchey |
| 2015/0363483 | A1 | 12/2015 | Behnen et al. |
| 2016/0078057 | A1 | 3/2016 | Perez |
| 2016/0110528 | A1 | 4/2016 | Gupta et al. |
| 2016/0119434 | A1 | 4/2016 | Dong et al. |
| 2016/0148074 | A1 | 5/2016 | Jean et al. |
| 2016/0180068 | A1 | 6/2016 | Das et al. |
| 2016/0239649 | A1 | 8/2016 | Zhao |
| 2016/0285979 | A1 | 9/2016 | Wang et al. |
| 2016/0321654 | A1 | 11/2016 | Lesavich et al. |
| 2016/0330027 | A1 | 11/2016 | Ebrahimi |
| 2016/0360998 | A1 | 12/2016 | Jun |
| 2016/0366126 | A1 | 12/2016 | Sharifi et al. |
| 2017/0132626 | A1 | 5/2017 | Kennedy |
| 2017/0228734 | A1 | 8/2017 | Kurian |
| 2017/0346851 | A1 | 11/2017 | Drake |
| 2017/0364673 | A1 | 12/2017 | Gupta et al. |
| 2018/0012003 | A1 | 1/2018 | Asulin et al. |
| 2018/0025146 | A1 | 1/2018 | Vasyltsov et al. |
| 2018/0026802 | A1 | 1/2018 | Barrett et al. |
| 2018/0054791 | A1 | 2/2018 | Pasulka |
| 2018/0063099 | A1 | 3/2018 | Versteeg et al. |
| 2018/0101848 | A1 | 4/2018 | Castagna et al. |
| 2018/0103042 | A1 | 4/2018 | Castagna et al. |
| 2018/0107833 | A1 | 4/2018 | Gadepalli et al. |
| 2018/0113888 | A1 | 4/2018 | Peña Muñoz et al. |
| 2018/0123882 | A1 | 5/2018 | Anderson et al. |
| 2018/0129956 | A1 | 5/2018 | Saxena et al. |
| 2018/0131706 | A1 | 5/2018 | Anderson et al. |
| 2018/0139043 | A1 | 5/2018 | Jayachandran et al. |
| 2018/0167370 | A1 | 6/2018 | Frahim et al. |
| 2018/0181569 | A1 | 6/2018 | Jarr et al. |
| 2018/0181751 | A1 | 6/2018 | Jagadeesan et al. |
| 2018/0211168 | A1 | 7/2018 | Khurshudov et al. |
| 2018/0330116 | A1 | 11/2018 | He |
| 2018/0330348 | A1 | 11/2018 | Uhr et al. |
| 2018/0336464 | A1 | 11/2018 | Karras et al. |
| 2019/0027237 | A1 | 1/2019 | Mcfarlane |
| 2019/0102411 | A1 | 4/2019 | Hung et al. |
| 2019/0113905 | A1 | 4/2019 | Corr et al. |
| 2019/0140822 | A1 | 5/2019 | Xie et al. |
| 2019/0140848 | A1 | 5/2019 | Dontov et al. |
| 2019/0140919 | A1 | 5/2019 | Smith et al. |
| 2019/0163912 | A1 | 5/2019 | Kumar et al. |
| 2019/0166116 | A1 | 5/2019 | Kumar et al. |
| 2019/0189254 | A1 | 6/2019 | Roennow |
| 2019/0207813 | A1 | 7/2019 | Uehara et al. |
| 2019/0229930 | A1 | 7/2019 | Haque et al. |
| 2019/0245699 | A1 | 8/2019 | Irwan et al. |
| 2019/0268147 | A1 | 8/2019 | Baird |
| 2019/0303920 | A1 | 10/2019 | Balaraman et al. |
| 2019/0334700 | A1 | 10/2019 | Callan et al. |
| 2020/0073698 | A1 | 3/2020 | Wu |
| 2020/0081519 | A1 | 3/2020 | Kinarti et al. |
| 2020/0084202 | A1 | 3/2020 | Smith et al. |
| 2020/0112550 | A1 | 4/2020 | Roth |
| 2020/0126075 | A1 | 4/2020 | Fisch |
| 2020/0294048 | A1 | 9/2020 | Ye |
| 2020/0366493 | A1 | 11/2020 | Sood et al. |
| 2020/0372003 | A1 | 11/2020 | Boelderl-ermel et al. |
| 2020/0374700 | A1 | 11/2020 | Smith et al. |
| 2020/0409719 | A1 | 12/2020 | Daniel et al. |
| 2021/0021597 | A1 | 1/2021 | Salman |
| 2021/0271665 | A1 | 9/2021 | Jetzfellner |
| 2021/0328801 | A1 | 10/2021 | Sly |
| 2022/0056351 | A1 | 2/2022 | Karvo et al. |
| 2022/0100739 | A1 | 3/2022 | Roscoe et al. |
| 2022/0147513 | A1 | 5/2022 | Roscoe et al. |
| 2022/0188829 | A1 | 6/2022 | Pioli |
| 2023/0177489 | A1 | 6/2023 | Chan |
| 2023/0208486 | A1 | 6/2023 | Dai et al. |
| 2023/0239154 | A1 | 7/2023 | Ali et al. |
| 2023/0239304 | A1 | 7/2023 | Ducatel et al. |
| 2023/0281286 | A1 | 9/2023 | Lindskog |
| 2024/0162960 | A1* | 5/2024 | Astrom .................... H04B 7/06 |
| 2024/0337722 | A1* | 10/2024 | Shrivastava ....... H04B 7/04013 |

FOREIGN PATENT DOCUMENTS

| | | | |
|---|---|---|---|
| CN | 107682331 A | 2/2018 | |
| CN | 108540483 A | 9/2018 | |
| CN | 105678125 B | 2/2019 | |
| CN | 109961826 A | 7/2019 | |
| CN | 110012015 A | 7/2019 | |
| CN | 110086804 A | 8/2019 | |
| CN | 110266352 A | 9/2019 | |
| CN | 106911001 B | 10/2019 | |
| CN | 111010219 A | 4/2020 | |
| CN | 111181618 A | 5/2020 | |
| CN | 111010219 B | 11/2020 | |
| CN | 110086804 B | 8/2021 | |
| CN | 113992254 A | * 1/2022 | ........... H04B 7/0626 |
| EP | 3574461 A2 | 12/2019 | |
| GB | 2582270 A | 9/2020 | |
| GB | 2596335 A | 12/2021 | |
| WO | 2017001117 A1 | 1/2017 | |
| WO | WO-2017001948 A1 | 1/2017 | |
| WO | 2017021155 A1 | 2/2017 | |
| WO | 2018013260 A1 | 1/2018 | |
| WO | 2018099920 A1 | 6/2018 | |
| WO | 2018161478 A1 | 9/2018 | |
| WO | 2018228337 A1 | 12/2018 | |
| WO | WO-2018219652 A2 | 12/2018 | |
| WO | 2019033116 A1 | 2/2019 | |
| WO | 2019072312 A2 | 4/2019 | |
| WO | 2019156716 A1 | 8/2019 | |
| WO | 2019161412 A1 | 8/2019 | |
| WO | 2019185343 A1 | 10/2019 | |
| WO | 2020031086 A1 | 2/2020 | |
| WO | 2020074456 A1 | 4/2020 | |
| WO | 2020178206 A1 | 9/2020 | |
| WO | 2021259705 A1 | 12/2021 | |

OTHER PUBLICATIONS

Carrasco E., et al., "Shaped Beam Reconfigurable Reflectarray with Gathered Elements in an Irregular Lattice for LMDS Base Station," Antennas and Propagation (EUCAP), Proceedings of the 5th European Conference, IEEE, Apr. 11, 2011, pp. 975-978.

(56) References Cited

OTHER PUBLICATIONS

Dai L., et al., "Reconfigurable Intelligent Surface-Based Wireless Communications: Antenna Design, Prototyping, and Experimental Results," IEEE Access, 2020, vol. 8, pp. 45913-45923.
Gao X., "Turbo-Like Beamforming Based on Tabu Search Algorithm for Millimeter-Wave Massive MIMO Systems," IEEE Transactions on Vehicular Technology, Jul. 2016, vol. 65, No. 7, pp. 5731-5737.
Guo H., et al., "Weighted Sum-Rate Optimization for Intelligent Reflecting Surface Enhanced Wireless Networks," 2019, 13 pages.
Hu C., "Two-Timescale Channel Estimation for Reconfigurable Intelligent Surface Aided Wireless Communications," IEEE Transactions on Communications, Nov. 2021, vol. 69, No. 11, pp. 7736-7747.
Huang C., et al., "Reconfigurable Intelligent Surfaces for Energy Efficiency in Wireless Communication," IEEE Transactions on Wireless Communications, Aug. 2019, vol. 18, No. 8, pp. 4157-4170.
International Preliminary Report on Patentability for International Application No. PCT/EP2021/059385, mailed Sep. 1, 2022, 36 pages.
International Search Report and Written Opinion for Application No. PCT/CN2020/093299, mailed on Feb. 24, 2021, 09 pages.
International Search Report and Written Opinion for International Application No. PCT/EP2021/059385, mailed Jun. 29, 2021, 18 pages.
Jung M., et al., "Reliability Analysis of Large Intelligent Surfaces (LISs): Rate Distribution and Outage Probability," 2019, 12 pages.
Liaskos C., et al., "Design and Development of Software Defined Meta-Materials for Nanonetworks," IEEE Circuits and Systems Magazine, 2015, pp. 12-25.
Mehta N. B., et al., "Antenna Selection in LTE: From Motivation to Specification," IEEE Communications Magazine, Oct. 2012, pp. 144-150.
Ozdogan O., et al., "Intelligent Reflecting Surfaces: Physics, Propagation, and Pathloss Modeling," IEEE Wireless Communications Letters, May 2020, vol. 9, No. 5, pp. 581-585.
Razavizadeh M. S., et al., "3D Beamforming in Reconfigurable Intelligent Surfaces-assisted Wireless Communication Networks," Arxiv Org, Cornell University Library, Jan. 18, 2020, 5 pages.
Renzo M. D., et al., "Reconfigurable Intelligent Surfaces vs Relaying: Differences, Similarities, and Performance Comparison," IEEE Open Journal of the Communications Society, 2020, vol. 1, pp. 798-807.
Rubinstein R. Y., et al., "The Cross-Entropy Method: A Unified Approach to Combinatorial Optimization, Monte-Carlo Simulation and Machine Learning," 2004, 316 pages.
Wang B., et al., "Performance of the Large-Scale Adaptive Array Antennas in the Presence of Mutual Coupling Bin Wang," IEEE Transactions on Antennas and Propagation, Jun. 2016, vol. 64, No. 6, pp. 2236-2245.
Wang P., et al., "Intelligent Reflecting Surface-Assisted Millimeter Wave Communications: Joint Active and Passive Precoding Design," IEEE Transactions on Vehicular Technology, Dec. 2020, vol. 69, No. 12, pp. 14960-14973.
Wang X., et al., "Analysis and Design of Optimum Sparse Array Configurations for Adaptive Beamforming," IEEE Transactions on Signal Processing, 2017, vol. 66, No. 2, pp. 340-351.
Written Opinion for International Application No. PCT/EP2021/059385, mailed May 6, 2022, 14 pages.
Wu Q., et al., "Beamforming Optimization for Intelligent Reflecting Surface With Discrete Phase Shifts," International Conference on Acoustics, Speech, and Signal Processing, 2019, pp. 7830-7833.
Zhang Z., et al., "A Joint Precoding Framework for Wideband Reconfigurable Intelligent Surface-Aided Cell-Free Network," 2020, 14 pages.
Zhao J., et al., "A Survey of Intelligent Reflecting Surfaces (IRSs): Towards 6G Wireless Communication Networks," 2019, 7 pages.
Dynamically Create Smart Contract Structure based on User Input, Ethereum Stack Exchange, Retrieved from the internet <https://ethereum.stackexchange.com/questions/64974/dynamically-create-smart-contract-structure-based-on-user-input>, Jan. 4, 2019, 3 pages.
IDWallet Biometric Cryptocurrency Platform, EchoSystem, Identita Inc., 2 pages.
Layer, "Trove Digital Wallet System", "FinTech Fashion, Retrieved from the Internet: URL: https://layerdesign.com/project/trove/#top-page", 2020, 9 pages.
Secure Communication, Wikipedia, Retrieved from the Internet: URL: https://en.wikipedia.org/w/index.php?title=Secure_communication&oldid=947140587, XP055779633, Mar. 24, 2020, 7 pages.
Sovrin: A Protocol and Token for Self-Sovereign Identity and Decentralized Trust, Sovrin Foundation, Jan. 16, 2018, pp. 1-42.
Ali, et al., "A Broadcast-Based Key Agreement Scheme Using Set Reconciliation for Wireless Body Area Networks", Journal of Medical Systems, vol. 38, No. 33, Apr. 18, 2014, pp. 1-12.
Allen, et al., "The Path to Self-Sovereign Identity", Life With Alacrity, Apr. 25, 2016, pp. 1-21.
Altop, et al., "Towards using physiological signals as cryptographic keys in Body Area Networks", 9th International Conference on Pervasive Computing Technologies for Healthcare (PervasiveHealth), Istanbul, Turkey, May 2015, pp. 92-99, doi: 10.4108/icst.pervasivehealth.2015.260074.
Antonopoulos, "Mastering Bitcoin—Unlocking Digital Crypto-Currencies", O'Reilly Media, 2014, 282 pages.
Bashir, et al., "Mastering Blockchain", Packt Publishing, Mar. 17, 2017, 531 pages.
Betts, et al., "Secure your Internet of Things (IoT) Deployment", Aug. 3, 2019, 4 pages.
Brogan, et al., "Authenticating Health Activity Data Using Distributed Ledger Technologies", Computational and Structural Biotechnology Journal, vol. 16, 2018, pp. 257-266.
Chen, et al., "Blockchain based Searchable Encryption for Electronic Health Record Sharing", Future Generation Computer Systems, vol. 95, Jun. 2019, pp. 420-429.
Kalis, et al., "Validating Data Integrity with Blockchain", IEEE International Conference on Cloud Computing Technology and Science (CloudCom), Dec. 2018, pp. 272-277.
Karimian, et al., "Highly Reliable Key Generation From Electrocardiogram (ECG)", IEEE Transactions on Biomedical Engineering, vol. 64, No. 6, Jun. 2017, pp. 1400-1411, doi: 10.1109/TBME.2016.2607020.
Kuperberg, "Blockchain-Based Identity Management: A Survey From the Enterprise and Ecosystem Perspective", IEEE Transactions on Engineering Management, vol. 67, No. 4, Aug. 8, 2019, pp. 1008-1027.
Lazouski, et al., "A Prototype for Enforcing Usage Control Policies Based on XACML", TrustBus, LNCS 7449, 2012, pp. 79-92.
Li, et al., "Using Data Augmentation in Continuous Authentication on Smartphones", IEEE Internet of Things Journal, vol. 6, No. 1, Jun. 27, 2018 , pp. 628-640.
Moosavi, et al., "Cryptographic key Generation using ECG signal", 14th IEEE Annual Consumer Communications & Networking Conference (CCNC), Las Vegas, NV, USA, Jan. 2017, pp. 1024-1031, doi: 10.1109/CCNC.2017.7983280.
Moosavi, et al., "Low-Latency Approach for Secure ECG Feature Based Cryptographic Key Generation", IEEE Access, vol. 6, 2018, pp. 428-442, doi: 10.1109/ACCESS.2017.2766523.
Pirbhulal, et al., "A Novel Biometric Algorithm to Body Sensor Networks", Part of the Smart Sensors, Measurement and Instrumentation book series, vol. 15, 2015, pp. 57-79.
Qureshi, "How to Optimize Blockchain Implementation for Your Company", Retrieved from the Internet: https://medium.com/@adamqureshi/how-to-optimize-blockchain-implementation-for-your-company-2fe329c08cd9, Jun. 19, 2016, 7 pages.
Ra, et al., "A Study on KSI-based Authentication Management and Communication for Secure Smart Home Environments", KSII Transactions on Internet and Information Systems, vol. 12, No. 2, Feb. 2018, pp. 892-905.
Ren, et al., "Data Storage Mechanism Based on Blockchain with Privacy Protection in Wireless Body Area Network", Sensors, vol. 19, No. 2395, May 25, 2019, 16 pages.

(56) References Cited

OTHER PUBLICATIONS

Swan, "Blockchain: Blueprint for a New Economy", Retrieved from the Internet: http://w2blockchain-tec.net/blockchain/blockchainby-melanie-swan.pdf, Jan. 22, 2015, 149 pages.

Tempesta, "Decentralized Applications with Azure Blockchain as a Service", vol. 33, No. 7, Retrieved from the Internet: https://msdn.microsoft.com/enus/magazine/mt847188.aspx, Jul. 2018, 14 pages.

Venkatasubramanian, et al., "Plethysmogram-Based Secure Inter-Sensor Communication in Body Area Networks", IEEE Military Communications Conference, MILCOM 2008, 7 pages.

Wu, et al., "Dependable Public Ledger for Policy Compliance, a Blockchain Based Approach", IEEE 39th International Conference on Distributed Computing Systems (ICDCS), Jul. 2019, pp. 1891-1900.

Xu, et al., "An Identity Management and Authentication Scheme Based on Redactable Blockchain for Mobile Networks", IEEE Transactions on Vehicular Technology, vol. 69, No. 6, Jun. 2020, pp. 6688-6698.

Xu, et al., "Healthchain: A Blockchain-Based Privacy Preserving Scheme for Large-Scale Health Data", IEEE Internet of Things Journal, vol. 6, No. 5, Oct. 2019, pp. 8770-8781.

Yao, et al., "An ECG-Based Signal Key Establishment Protocol in Body Area Networks", 7th International Conference on Ubiquitous Intelligence & Computing and 7th International Conference on Autonomic & Trusted Computing, Xi'an, China, Oct. 2010, pp. 233-238, doi: 10.1109/UIC-ATC.2010.7.

Zhang, et al., "Blockchain-Based Trust Mechanism for IoT-Based Smart Manufacturing System", IEEE Transactions on Computational Social Systems, Dec. 2019, 9 pages.

Zhao, et al., "Lightweight Backup and Efficient Recovery Scheme for Health Blockchain Keys", IEEE 13th International Symposium on Autonomous Decentralized Systems, 2017, pp. 229-234.

* cited by examiner

RIS-ASSISTED WIRELESS COMMUNICATIONS

PRIORITY CLAIM

The present application is a National Phase entry of PCT Application No. PCT/EP2021/059385, filed Apr. 12, 2021, which claims priority from CN2020/093299, filed May 29, 2020, each of which is hereby fully incorporated herein by reference.

TECHNICAL FIELD

This disclosure relates to joint beamforming design for an irregular RIS-assisted wireless communication with adaptive topology.

BACKGROUND

In wireless communications it is an ongoing objective to optimize the system to handle the most information, with the fewest errors, and over the widest range possible. Recently physical components of wireless communication networks have included reconfigurable intelligent surfaces (RIS), also known as reflective intelligent surfaces. RISs are typically reflector surfaces which comprise multiple reflective elements. The reflective elements can be adjusted so as to allow for a signal which is being reflected off of the surface to be directed. The surface itself is often used to extend the range of a wireless signal without the need for a repeater, or to direct the signal around interfering structures which would otherwise block the signal.

A typical issue associated with the use of RISs is the joint beamforming design for RIS-assisted communication systems. This is often tackled as an optimization problem with given objective function and constraint conditions. For example, this may be the case when considering a downlink wireless network aided by RIS with discrete phase shifts, comprising a base station (BS) with multiple, M, antennas, and an RIS with N elements, all simultaneously serving K users.

In existing methods it has been shown that it is possible to model a power minimization problem expressed as $\min \Sigma_{k=1}^{K} \|w_k\|_2^2$, given SINR constraints at the user equipment (UE) and a known phase shift precision at the RIS.

This system model and proposed algorithm is a feasible joint beamforming design for traditional RIS-assisted communication systems. However, it cannot meet the challenge of capacity enhancement for traditional networks with limited RIS elements, as well as the challenge of poor adaptability to varying channels.

Another technique is to use phased arrays. The use of phased arrays can allow for some transmission antennas to be 'on' while others are 'off'. This allows the phased array to create the intended transmission. Phased arrays and MS can be used together for improved performance or can be used independently. However, they are not direct alternatives to each other as they achieve different outcomes in relation to the optimization of the system by very different means.

SUMMARY

It is desirable to develop a wireless communication system design which both enhances the capacity of the communication system while remaining adaptable to the various changing conditions of the system.

According to one aspect there is provided a reflective surface for directing wireless communications signals, the reflective surface comprising a plurality of independently reconfigurable elements disposed irregularly on the surface.

The surface may define a regular array of zones, each of the reconfigurable elements occupying a respective zone, at least some of the reconfigurable elements occupying adjacent zones, and some of the zones may not be occupied by a reconfigurable element.

The surface may define a regular array of zones, some of the zones may be occupied by a reconfigurable element and some of the zones may not be occupied by a reconfigurable element, a first set of zones in the regular array of zones may have a first density of reconfigurable elements and a second set of zones in the regular array of zones may have a second density of reconfigurable elements.

The elements may occupy fewer than 75% of the zones.

The elements may define a field of elements on the surface, the field having a periphery, each reconfigurable element may have a local environment defined by the set of vectors from that element to the elements neighboring that element, and at least two reconfigurable elements not at the periphery of the field may have different local environments.

The attitude and/or location of each reconfigurable element may be adjustable and the reconfigurable surface may comprise a controller configured for controlling the attitude and/or location of each reconfigurable element.

According to a second aspect there is provided a reconfigurable surface for directing wireless communications signals, the reconfigurable surface comprising: a plurality of independently reconfigurable elements disposed on the surface; and a controller arranged to control the configuration of the plurality of independently reconfigurable elements so that only an irregularly spaced subset of the reconfigurable elements direct the signals.

The surface may define a regular array of zones, each of the elements of the subset may occupy a respective zone, at least some of the reconfigurable elements may occupy adjacent zones, and some of the zones may not be occupied by a reconfigurable element.

The surface may define a regular array of zones, some of the zones may be occupied by a reconfigurable element and some of the zones may not be occupied by a reconfigurable element, a first set of zones in the regular array of zones may have a first density of reconfigurable elements and a second set of zones in the regular array of zones may have a second density of reconfigurable elements.

The reconfigurable elements of the subset may occupy fewer than 75% of the zones. The elements of the subset may define a field of elements on the surface, the field having a periphery, each reconfigurable element may have a local environment defined by the set of vectors from that element to the elements of the subset neighboring that element, and at least two reconfigurable elements of the subset not at the periphery of the field may have different local environments.

The attitude and/or location of each reconfigurable element may be adjustable and the controller may be configured for controlling the attitude and/or location of each reconfigurable element.

The controller may be configured for causing the reconfigurable surface to act as a beamforming reflector.

Each reconfigurable element may be a radio reflector.

Each reconfigurable element may be mounted on a support by an element of a metamaterial (which may include an integrated network of nanomachines) and may be actuable (e.g. by the integrated network of nanomachines) to alter the attitude and/or location of the reconfigurable element.

According to a third aspect there is provided a wireless communication system comprising: a base station comprising multiple antennas; and a reflective surface according to the first or second aspect, the reflective surface being configured to act as a beamforming reflector for radio signals to or from the antennas.

The reconfigurable surface may be configured to cause the system to operate as a multiuser multiple-input single-output wireless communications system for serving one or more user devices with one of the said antennas.

The reconfigurable surface may be configured to cause the system to operate as a multiuser multiple-input multiple-output wireless communications system for serving one or more user devices with multiple ones of the said antennas.

According to a fourth aspect there is provided a method of controlling a communication channel of a wireless communication system, the system comprising a reflective surface having an irregular element arrangement, the method comprising: generating a first topology matrix based on an initial structure of the reflective surface; determining a beamforming design and corresponding user sum-rate based on estimated channel matrices for a communication path; generating a plurality of second topology matrices corresponding to a structure of the reflective surface which is varied from the initial structure by a configuration of at least one element; forming a beamforming design for each of the plurality of second topology matrices; calculating a user sum-rate for each of the plurality of second topology matrices; and selecting, from the plurality of second topology matrices, a new topology matrix based on the calculated user sum-rates.

The reflective surface may support a communication channel and the method comprises determining that a triggering criterion is met, the triggering criterion being any one of: detecting changes in propagation characteristics of the channel, detecting a change in a service requirement of a user served by the channel, receiving an update from a network operator, detecting changes in a frequency range used for transmissions in the communication channel, and the elapsing of a pre-defined amount of time; and in response to the triggering criterion being met, performing the operations of the fourth aspect.

The change in the propagation characteristics of the channel may be signaled by a change in channel state information.

The plurality of second topology matrices may be generated using a Tabu-Search algorithm.

One beamforming design may be formed by alternating an optimization of a digital precoding matrix and a phase shift matrix of the structure.

The phase shift matrix may be refined using a successive refinement algorithm.

The digital precoding matrix may be optimized by a Zero Forcing method.

BRIEF DESCRIPTION OF THE FIGURES

The present disclosure will now be described by way of example with reference to the accompanying drawings. In the drawings.

DETAILED DESCRIPTION

Figure 1:
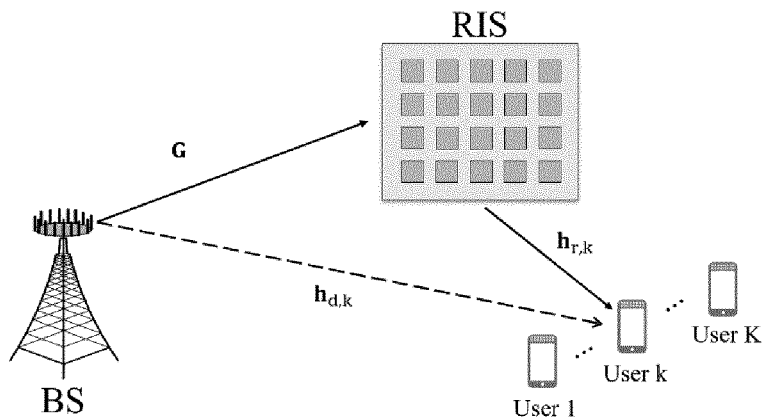
FIG. 1 shows a typical RIS-assisted multiuser MISO downlink wireless communication system.

Reconfigurable Intelligent Surface (RIS), also known as Reflective Intelligent Surface (using the same acronym, RIS), is a promising technology used to improve the spectral efficiency in wireless communication systems. However, the overall system complexity increases unbearably with the increasing number of MS elements, leading to a nonnegligible overhead of channel estimating, feedback and beam design. Therefore, improving the system performance through increasing the number of RIS elements has limitations.

Traditional regular array based RISs are also unable to adapt to changing conditions such as changing channels. Thus, enhancing the capacity of traditional regular RIS-assisted wireless communication with a limited number of RIS elements becomes a challenge.

To achieve the above goal, an irregular surface based adaptive beamforming design scheme for an RIS-assisted wireless communication system is proposed. The proposed design comprises an irregular architecture of RIS elements. Each reconfigurable element may be a radio reflector. For example, the elements may be sparsely arranged on a surface, which provides a greater number of degrees of freedom and adaptability to different channel conditions. Thus there is proposed a reconfigurable surface for directing wireless communications signals, the reconfigurable surface comprising a plurality of independently reconfigurable elements disposed irregularly on the surface. As part of the reconfigurable surface, the surface may define a regular array of zones. For example, the zones may comprise the area within which an RIS element attached to a specific lattice point of the RIS may be located. Each of the reconfigurable elements occupies a respective zone. At least some of the reconfigurable elements occupy adjacent zones, and some of the zones are not occupied by a reconfigurable element. That is to say, some of the lattice points may not have a respective radio reflector element disposed at its location. In a further example, the surface may define a regular array of zones where some zones include a reflective element and some zones don't include a reflective element, and there is a first density of reflective elements in a first subset of (contiguous) zones and a second density of reflective elements in a second subset of (contiguous) zones, wherein the first density is different to the second density.

Based on the quasi-static channel between the base station (BS) and RIS, it may then be possible to adjust the irregular topology of RIS, for example by using integrated microcontrollers, to optimize the beamforming design. This can be done over a large timescale as the amount of change in the system is small within this amount of time. Specifically, it has been determined that the RIS topology and beamforming design can be optimized in a large timescale, which acquires quasi-optimal performance with low complexity. A controller may therefore be configured for causing the reconfigurable surface to act as a beamforming reflector.

Using an RIS therefore provides the significant benefit of a controllable channel. Compared to the use of phase arrays, an RIS can be used at a lower cost, achieve better form factors, and require a lower power consumption.

FIG. 1 shows an example implementation in an RIS-assisted multiuser multiple-input single-output (MISO) downlink wireless communication system. The BS is equipped with M antennas and the RIS is equipped with N elements to serve K single-antenna user equipments. The apparatus and methods proposed herein can be extended to a scenario with multiple-antenna UEs by employing combining at the UEs. This is not considered in this example for the purpose of simplifying the explanation. Also, since the propagation loss of the reflection path is severe, multiple reflections of the RIS are ignored, and only the single reflection path is considered.

The received signal vector at the user end (UE) can be presented as $$y = (H_r^H \Theta G + H_d^H) x + n,$$

where $H_r = [h_{r,1}, h_{r,2}, \ldots, h_{r,K}]$ is the channel matrix between the RIS and K users, G is the channel between the BS and the RIS, and $H_d$ is the direct channel between the BS and the UE. $\Theta = \text{diag}([\beta_1 e^{j\Theta_1}, \beta_2 e^{j\Theta_2}, \ldots, \beta_N e^{j\Theta_N}])$ and is the phase shift matrix where each diagonal element represents the reflection coefficient of a particular RIS element. Digital precoding is adopted at the BS with $x = \Sigma_{k=1}^K w_k s_k$, where $w_k$ is the precoding vector for the k-th user and s denotes the transmitted signal vector with $\mathbb{E}(ss^H) = I_K$. The additive white Gaussian noise (AWGN) vector n satisfies $n \sim CN(0, \sigma^2 I_K)$, where $\sigma^2$ represents the noise power.

In this example large-scale fading and small-scale fading are considered simultaneously. The large-scale fading is distance-dependent path loss and can be expressed as $f(d) = C_0 d^{-\alpha}$, where $C_0$ is the channel fading variables depending on the path, d is the distance between the transmitter and the receiver, and $\alpha$ is the pathloss exponent. Since the BS-RIS-UE path suffers "double-fading" effect, the pathloss exponent can be set as $\alpha_{BR} = \alpha_{BU} = 2$. For the small-scale fading, the traditional Rayleigh fading channel model may be adopted, where each entry of the channel matrix follows a complex Gaussian distribution.

In traditional communication systems without RIS, the precoding matrix at the BS is determined by the downlink channel state information (CSI), which can be acquired by channel estimation and channel feedback. Whereas in RIS-assisted communication systems, the digital precoding matrix W at the BS and the phase shift matrix $\Theta$ should be jointly optimized based on the CSI. This is because the two matrices are coupled together due to the design of the system. The aim in the presently proposed system is to maximize the spectral efficiency, and therefore it is the weighted sum-rate of all users which is used to evaluate the precoding performance. The precoding performance can therefore be denoted as $R = \Sigma_{k=1}^K \omega_k \log_2 (1+\gamma_k)$, where $\omega_k$ is the weight of user k and $\gamma_k$ is the signal-to-interference-plus-noise ratio (SINR) of user k.

The problems in current improvement of RIS-assisted communication systems are the number of MS elements being limited to reduce computational overheads and the lack of adaptability to changing channel states. Though the system performance can be improved by increasing the number of RIS elements, this introduces significant overhead. In addition, it is worth noting that the communication environment tends to change over time. While the traditional regular array based RIS of a single topological structure cannot provide sufficient degrees of freedom for different channel conditions.

Consider that the precision of phase shifters at the RIS is limited in practical systems, we assume 1-bit phase shift of each RIS element in this invention, which can be easily realized by voltage-driven diodes.

To tackle the above explained issues which constrain the existing wireless communication systems with respect to capacity, there is proposed an irregular RIS based adaptive beamforming design scheme.

Figure 2:
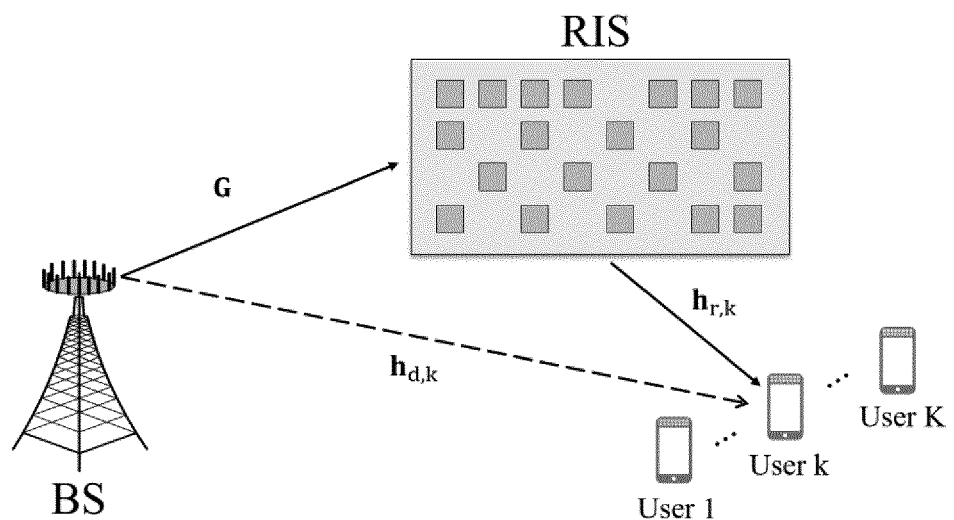
FIG. 2 shows an RIS-assisted multiuser MISO communication system where the MS elements are irregularly arranged.

FIG. 2 shows a first feature of the proposed design which is an irregular architecture of RIS elements in the RIS. By arranging the elements in an irregular way, contrary to the typical regular arrangement of elements, the system capacity can be improved without increasing the number of elements, while also improving the adaptability of the system to a greater number of channel environments. That is, it is possible to implement an RIS with sparsely arranged elements with varying distances between neighboring elements to provide the RIS as a whole with a larger number of configuration options, and thus the ability to support a larger number of channel conditions, without requiring additional elements increasing the computational overhead. Therefore there is also proposed a wireless communication system as in FIG. 2 comprising a base station comprising multiple antennas; and an irregular reconfigurable surface being configured to act as a beamforming reflector for radio signals to or from the antennas.

Specifically, FIG. 2 shows an RIS with N reflecting elements which are sparsely distributed over $N_s$ lattice points on the RIS. Thus, there is presented an irregular RIS-assisted multiuser MISO downlink wireless communication system, where K single-antenna users are served by the irregular RIS and the B S equipped with M antennas. The spacing between lattice points of RIS may be assumed to be half of the signal wavelength.

The irregular design of RIS may be achieved in various ways. For example, as described herein it may be possible to use an integrated microcontroller to control the physical position of the RIS elements under the lattice constraint. Where the lattice points are the points at which the RIS elements attach to the surface. In such a case the reconfigurable elements may occupy fewer than 75% of the zones.

The elements may be thought of as defining a field of elements on the surface. The field having a periphery, and each reconfigurable element having a local environment defined by the set of vectors from that element to the elements neighboring that element. At least two reconfigurable elements not at the periphery of the field or surface have different local environments.

The attitude or spatial orientation of each reconfigurable element may be adjustable. For example, the element may be moved within its respective field on the surface to create the desired irregular arrangement. The elements may be arranged by a controller configured for controlling the attitude of each reconfigurable element. The controller may be part of the reconfigurable surface.

In some example, there may exist a regular arrangement of lattice points, but there may not be an element disposed at every lattice point. The alternative being that there may be an irregular arrangement of lattice points as part of the irregular RIS from time of manufacture. Thus, the surface may define a regular array of zones, each of the elements of a subset of irregularly spaced elements occupies a respective zone, at least some of the reconfigurable elements occupy adjacent zones, and some of the zones are not occupied by a reconfigurable element.

Another way to achieve the irregular arrangement of RIS elements is to have an N-element subset to be used for communication selected from a larger set. In this implementation respective elements for each lattice point may exist, but elements deployed at lattice points which are not selected are not used. These unused elements may be deemed discarded for the purposes of communication when the specific topology defined by the selected elements is required. That is, a plurality of independently reconfigurable elements which are disposed on the surface may be controlled by a controller such that only an irregularly spaced subset of the elements direct the signals. This may be achieved by configuring the reflectance of those irregularly spaced subset of elements to be greater than the reflectance of the reflective elements that are not the irregularly spaced subset of elements. The reflectance of the elements that are not the irregularly spaced subset of elements may be zero. The reconfigurable elements of the subset may occupy fewer than 75% of the zones.

In a similar way to the implementation described above, the elements of the subset define a field of elements on the surface, the field having a periphery, each reconfigurable element may have a local environment defined by the set of vectors from that element to the elements of the subset neighboring that element, and at least two reconfigurable elements of the subset not at the periphery of the field have different local environments.

For the example system as shown in FIG. 2, the received signal at the UE can be represented as $$y = (H_r^H S \Theta G + H_d^H) x + n, = H_e x + n$$

where the topology matrix S with size $N_s \times N_s$ is a diagonal matrix whose diagonal element $S_n$ (n=1, 2, ..., $N_s$) can only be 1 or 0, corresponding to whether an RIS element is deployed at the n-th lattice point or not, respectively. In the alternate implementation described above, this may correspond to whether the RIS element at a lattice point is 'on' or 'off'. Such a status of the reflective element may be achieved by any of a plurality of different configurations. For example, it may be possible to use the properties of metamaterials, or to use additional networks to control the 'on' or 'off' status. What are known as software-defined metamaterials may be of particular use in such an implementation. In this example, each reconfigurable element may be mounted on a support by an element of a metamaterial and integrated network of nanomachines which is actuable to alter the attitude of the reconfigurable element.

The phase shift matrix $\Theta$ with size $N_s \times N_s$ is a diagonal matrix whose diagonal element $\theta_n = e^{j\varphi_n}$ ($\varphi_n = 0$ or $\pi$, n=1, 2, ..., $N_s$) denotes the phase shift of the n-th lattice point. Note that there may be no RIS element at the lattice point, which is controlled by S. The channel matrix $H_r$ is of size $K \times N_s$ and G is of size $N_s \times M$. $H_d$, x and n are determined as in the description herein above. $H_e$ represents the equivalent channel between the BS and the UE.

Based on the irregular topology of RIS, the SINR $\gamma_k$ of user k can be expressed as $$\gamma_k = \frac{|(h_{r,k}^H S \Theta G + h_{d,k}^H) w_k|^2}{\sum_{i \neq k}^{K} |(h_{r,k}^H S \Theta G + h_{d,k}^H) w_i|^2 + \sigma^2}$$

If P denotes the maximum transmit power, then the weighted sum-rate maximization problem can be formulated as $$\max_{(s, w, \Theta)} \sum_{k=1}^{K} \omega_k \log_2(1 + \gamma_k),$$

$$\text{s.t.} \sum_{k=1}^{K} \|w_k\|_2^2 \leq P,$$

$$\theta_n \in \{1, -1\}, \forall n = 1, 2, \cdots, N_s,$$

$$S_n \in \{1, 0\}, \forall n = 1, 2, \cdots, N_s,$$

$$\sum_{n=1}^{N} S_n = N.$$

For this example implementation, a Tabu-Search based alternating iteration algorithm has been used. However, there are other optimization algorithms which may also be used to achieve the same result, such as a genetic algorithm, simulated annealing, particle swarm optimization, and machine learning. The optimization algorithm, here the Tabu-Search algorithm, is used to search for a feasible RIS topology S. That is, the optimization algorithm may be used to generate a topology of an RIS in terms of its irregular structure of elements which may be used in the system. Then, given that specific candidate irregular RIS topology, the coupled matrix W and $\Theta$ may be decoupled by alternating optimization. After one or more iterations of optimization a sub-optimal irregular RIS topology may be obtained. The acquired RIS topology will also be based on the specific channel model as described above. Therefore, any changes in the channel should be accounted for by any necessary updates to signify the different communication environment.

In the implementation example where RIS elements are moved into the required irregular arrangement the changing of the topology of the MS may rely on an integrated controller. For example, this may comprise a microcontroller. The inclusion of one or more controllers may result in additional complexity and power consumption when using this particular implementation method.

As mentioned above, the location of the BS and the RIS is fixed, leading to the quasi-static property of BS-RIS channel. Considering that an RIS is typically used only to serve users within a certain range, the equivalent channel $H_e$ of RIS-assisted communication system is relatively stable over a large period of time. Thus, the RIS topology and beamforming design based on channel estimation only needs to be optimized over a large timescale, which enables a quasi-optimal performance to be achieved with low complexity.

Figure 3:
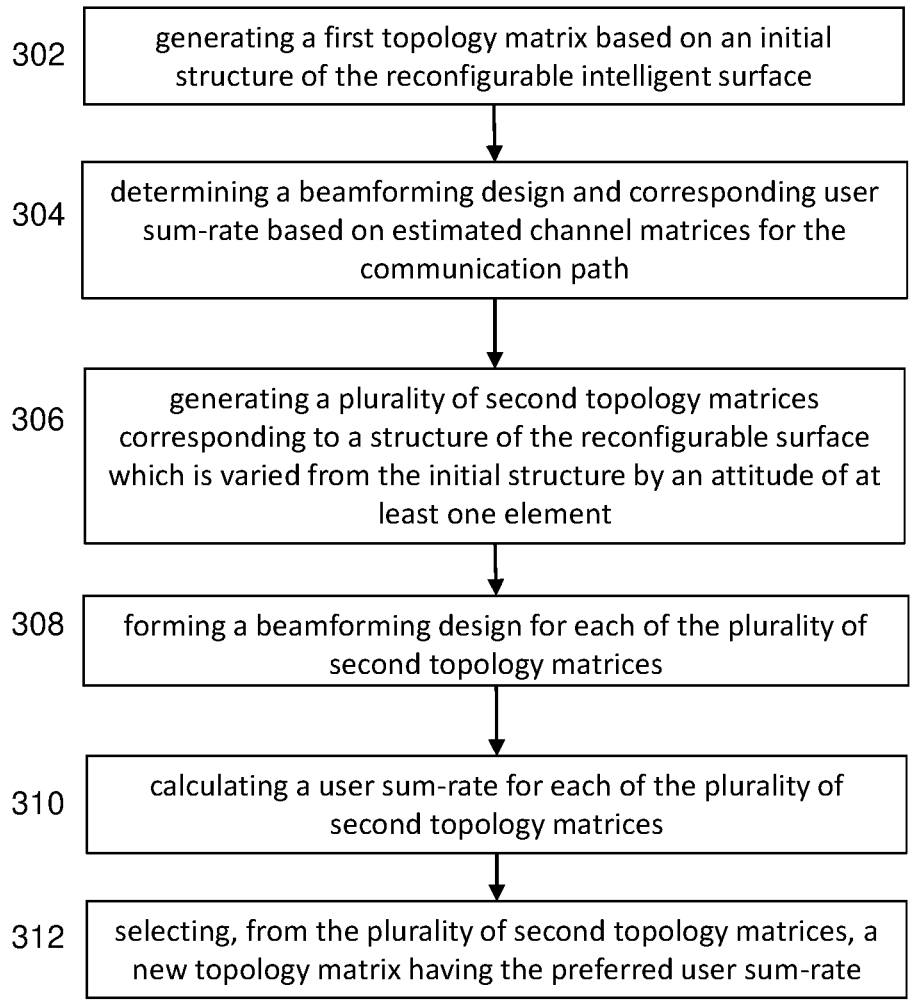
FIG. 3 shows a flow chart of the optimization method for the irregular RIS-assisted multiuser MISO communication system shown in FIG. 2.

An example method for the proposed adaptive beamforming procedure using an irregular RIS is described below in reference to FIG. 3.

It is assumed that an accurate channel matrix can be obtained via efficient channel estimation. The typical process of channel estimation to obtain a channel matrix for the direct channel between the BS and UE ($H_d$) is used in existing approaches for wireless communication optimization. Similar processes can be used for the estimation of the channel matrices representing the channel between the BS and RIS (G) and RIS and UE ($H_r$), which are also used in existing approaches. The maximum transmit power P, the RIS elements number N, and the RIS lattice points number $N_s$ are also pre-defined values. Therefore, the channel matrices $H_r$, G, and $H_d$; the maximum transmit power P; the RIS elements number N; and the RIS lattice points number $N_s$ are all inputs into the proposed adaptive beamforming process.

The MS elements number N and the RIS lattice points number $N_s$ depend on the RIS structure at the time. This structure is a known quantity which may be based either on a known previous arrangement of the RIS elements, or a known random arrangement of the RIS elements. As previously explained, the irregular arrangement may be formed by an irregular physical arrangement or attitude of the elements of the RIS, or alternatively an activation of a subset of elements which form an irregular pattern within a regular array of elements of the RIS, or a combination of the two implementations.

Once an initial irregular arrangement of elements and channel matrices are calculated, the optimization procedure for that arrangement may be carried out.

This may start with an initialization phase. The initialization phase may comprise the initial topology matrix $S_0$ based on the initial RIS structure being generated at 302, and the current topology, beamforming design and corresponding user sum-rate being saved as the global optimal solution S, W and $\Theta$ at 304. It is these values which may be optimized by one or more iterations of the following operations of the method.

Next is to generate the neighbors of $S_i$ by using the Tabu-Search algorithm at 306, creating candidate topologies. For example, one or more ones may be randomly swapped for zeros in the diagonal elements of the topology matrix to create $S_i$. The term neighbors is used to represent a topology which is close to that of the initial topology but with a slight alteration. In this way a group of different candidate topologies are created which can be individually assessed to find the one that provides the best output. Therefore this comprises generating a plurality of topology matrices corresponding to a structure of the reconfigurable surface which is varied from the initial structure by an attitude and/or location of at least one element. The attitude of the element is the spatial orientation of the element.

At 308 the beamforming design for each neighbor is optimized. So, for each of the candidate second topologies the beamforming design is altered so that it is optimized for that topology.

At 310 the user sum-rate for each neighbor topology is calculated. This is the value by which the different topologies are compared.

At 312, a new topology matrix having the preferred (e.g. greatest) user sum-rate is selected from the plurality of second topology matrices. The topology with the desired user sum-rate is the optimal neighbor and may be used at the new optimized topology for the irregular RIS. This topology may also be the initial RIS structure for any following iterations of the optimization.

Thus at 310 and 312 the sub-optimal beamforming design and corresponding user sum-rate are calculated. The global optimal solution may then be updated based on the selected optimal topography and optimized W and $\Theta$ may be produced. The globe optimal solution may be updated by comparing the optimal neighbor with the current optimal solution.

By implementing an iterative process it is possible to further refine the candidate topologies and arrive at a specific irregular topology for the RIS which optimizes the signal reflection for the given channel environment. The operation at 304 may be repeated for the optimal RIS structure selected from the previous iteration, and 306 to 312 may then be repeated to further optimize the RIS structure and corresponding beamforming design. By setting the appropriate termination conditions, the sub-optimal RIS topology and corresponding beamforming design can be obtained after the iteration.

If using a random initial arrangement of the elements of the RIS then it is possible to initialize the RIS topology S by randomly selecting N ones and Ns-N zeros to define the topology of the elements. For example, where one and zero represent whether there is an active element at the respective lattice point. In this initialization method, more iterations may be needed for convergence. However, the effectiveness of the proposed method is still the same.

$\Theta$ may be optimized by successive refinement (SR), particle swarm optimization, cross entropy optimization, machine learning, a codebook based method, etc. Thus, a successive refinement (SR) based iterative algorithm may be used. More specifically, in each iteration, N−1 phase shifts of RIS elements are fixed and the optimal solution of the remaining phase shift is obtained via one-dimensional search over the tunable phase set. There exist some other optimization algorithms which outperform the SR algorithm. However, considering its low complexity, the SR algorithm is used here as a contrast to those higher complexity algorithms while still being able to achieve an optimized result. W may be optimized by a zero-forcing precoder, the minimum mean squared error precoder, a codebook based method, etc.

The final output of the method is therefore an optimized RIS topology S and correspondingly optimized beamforming design W and $\Theta$.

The channel environment may change over time and the method may need to be repeated to account for these changes. There could be many triggers for repeating the optimization method described above.

One example of such a triggering criteria may be when there are changes to the channel. This could be detected by monitoring one of the CSI metrics. For example the metric could be monitored to check whether a value exceeds a pre-defined threshold. Alternatively or additionally, if for example the objective is maximum spectral efficiency, the spectral efficiency or throughput may be monitored and the trigger may be if one or both of these drop below a threshold.

The method may also be triggered by changes to the user's service requirements. If, for example, a user commences using a high priority service with a higher guaranteed throughput, then the method may be run to ensure the optimization is made to satisfy this additional user requirement. Alternatively, a user may stop using a service and this may trigger the optimization method. Such a stopping of use of a service may have a detrimental impact if for example the service that is stopped was very high priority. The optimization may continue to prioritize that user at the expense of others. As the user is no longer high priority, executing the proposed method may enhance the overall performance.

Another example triggering criteria may be the receiving of updates from the network operator about how services and users are prioritized. This could mean that the weights $\omega_k$ used in the optimisation function need to be adjusted. The network could also send updates of the optimization function itself. In the above example the objective is to maximize spectral efficiency. Other optimization functions could include more consistent user experience, e.g. those which focus on improving cell-edge users, improved energy efficiency for the base station, achieving different SINR targets (e.g. maximizing signal for some users and limiting signal levels and interference for others).

The above example focuses on optimizing the downlink performance. However, the objective could also be focused on uplink or a mix of uplink and downlink performance.

The trigger for executing the method could also be a periodic trigger. As the re-optimization of the topology of the RIS can occur on different, often much longer, timescales to the beamforming at the RIS and precoding at the base station, it may be the case that a simple periodic trigger would be sufficient to optimize the system.

Simulation results demonstrate that the proposed adaptive irregular RIS-assisted communication scheme can further improve the spectral efficiency with a limited number of RIS elements compared with traditional configurations.

Figure 4:
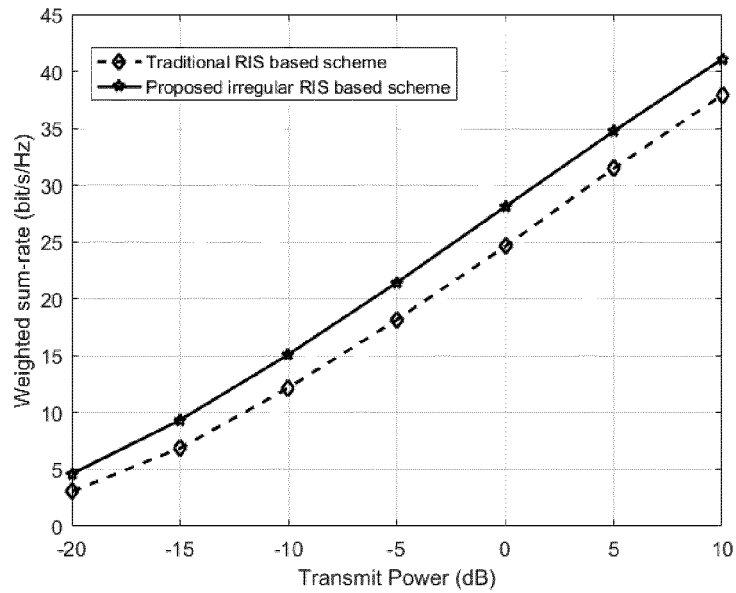
FIG. 4 shows a graph comparing the performance between the proposed irregular RIS-assisted communication configuration and a typical RIS based scheme.

To evaluate the performance of irregular RIS topology in the proposed joint beamforming design, simulations were carried out on the proposed irregular RIS-assisted communication configuration and a traditional RIS based scheme. A comparison of the results can be seen in FIG. 4. Θ is optimized by an SR algorithm in both schemes for fair comparison.

Figure 5:
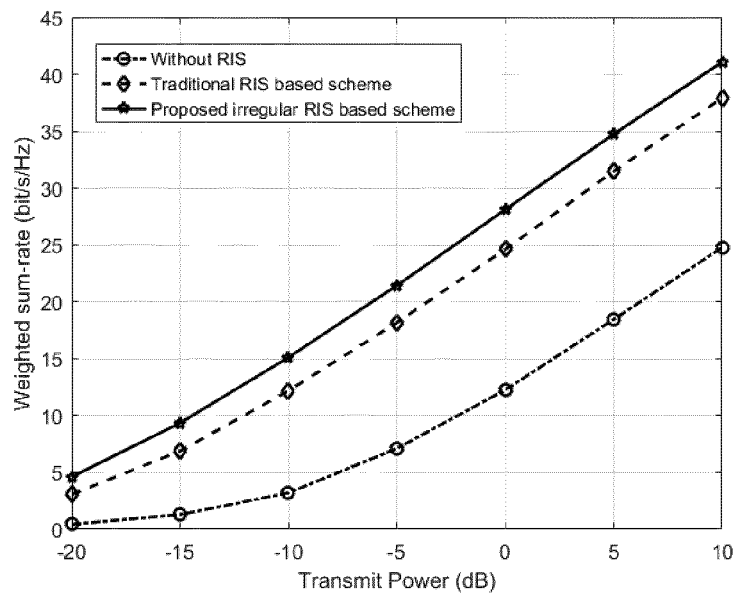
FIG. 5 shows a graph comparing the performance of the proposed irregular RIS-assisted communication configuration, a typical MS based scheme, and the scheme without RIS.

A comparison of the performance of systems without RIS is shown in FIG. 5. In the simulation the relevant parameters as described in relation to the above example implementation are set as $\alpha_{BU}=3$, $\omega_k=1$ for each user k, M=6, K=4, N=64 and $N_s=128$. It can be seen that the proposed irregular RIS based scheme outperforms the traditional RIS based scheme. This is because the optimization of MS topology provides additional degrees of freedom and the spatial diversity benefits by sacrificing space. In addition, the irregular structure of RIS elements improves the adaptability to specific channel conditions.

The above described irregular RIS topology and optimization method can apply to a range of scenarios. When changing between scenarios, this can be implemented simply by changing the optimization function and the user weights. For example, this would be the case for scenarios where users or services are given different priorities, and when the performance target changes, e.g. higher capacity, more consistent throughput, higher energy efficiency. For scenarios where the objective includes minimizing interference to users served by another base station, the proposed design can still function in the same way, however, CSI information from the neighboring base station would have to be shared. For example, this can be sent over a direct connection between the base stations.

If the proposed design is used for scenarios where CSI is not available in one of the regions of interest, then the base station may use training to ensure that the correct RIS configuration is being used. An example case is the use of an eavesdropper. If the objective is to minimize signal levels in the region of an eavesdropper, then a known configuration can be used that achieves this objective. This can be known in advance through training. The results of such training may be known either at the time of deployment, e.g. by previously moving test devices around the service area and testing many configurations of the BS and RIS; or built up over time after deployment by collecting information during the lifetime of the deployment whereby the base station may store information known about many configurations. For the case of achieving nulls, the system could store user locations and configurations of the BS and RIS, along with user performance achieved (in such cases this might be low signal levels or disconnection). When the system requests a null in a particular location, the base station may look at its historic records to see which configurations will achieve the null in the required areas, and then select from the matching options a configuration which achieves the null in the desired location.

One significant benefit of the irregular RIS, is that the spacings between active lattice points (or the elements disposed upon the lattice points) can be adjusted. In the above description it is an assumption that the spacing is half a wavelength in the regular pattern. The RIS performance is highly frequency dependent and the spacing between the fixed lattice points (which in turn dictate the locations of the reflector elements), is often chosen based on the intended frequency of use. The ability to turn on/off elements at specific lattice points gives a much greater ability of the RIS to optimize performance for different frequencies. When considering this, an additional trigger for executing the optimization method may be when the base station changes the frequencies it is using. For example, the change in frequency may be as a result of either reconfiguring an existing carrier, activating a new carrier, or simply focusing users on different subcarriers within the current bandwidth allocations.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of controlling a communication channel of a wireless communication system, the wireless communication system comprising a reflective surface having an irregular arrangement of reflective elements, the method comprising:
   generating a first topology matrix based on an initial structure of the reflective surface;
   determining a beamforming design and corresponding user sum-rate based on estimated channel matrices for a communication path;
   generating a plurality of second topology matrices corresponding to a structure of the reflective surface that is varied from the initial structure by a configuration of at least one reflective element;
   forming a beamforming design for each of the plurality of second topology matrices;
   calculating a user sum-rate for each of the plurality of second topology matrices; and
   selecting, from the plurality of second topology matrices, a new topology matrix based on the calculated user sum-rates.

2. The method of claim 1, wherein the reflective surface supports a communication channel and the method further comprises:
   determining that a triggering criterion is met, the triggering criterion being any one of:
      detecting changes in propagation characteristics of the communication channel,
      detecting a change in a service requirement of a user served by the communication channel, detecting changes in a frequency range used for transmissions in the communication channel, receiving an update from a network operator, or elapsing of a pre-defined amount of time; and in response to the triggering criterion being met, repeating generating the first topology matrix, determining the beamforming design and the corresponding user sum-rate, generating the plurality of the second topology matrices, forming the beamforming design, calculating the user sum-rate for each of the plurality of second topology matrices, and selecting, from the plurality of second topology matrices, the new topology matrix based on the calculated user sum-rates.

3. The method of claim 2, wherein the change in the propagation characteristics of the communication channel is signaled by a change in channel state information.

4. The method of claim 1, wherein the plurality of second topology matrices are generated using a Tabu-Search algorithm.

5. The method of claim 1, wherein the beamforming design is formed by alternating an optimization of a digital precoding matrix and a phase shift matrix of the structure of the reflective surface.

6. The method of claim 5, wherein the phase shift matrix is refined using a successive refinement algorithm.

7. The method of claim 5, wherein the digital precoding matrix is optimized by a Zero Forcing method.

\* \* \* \* \*